Figures 1, 2:
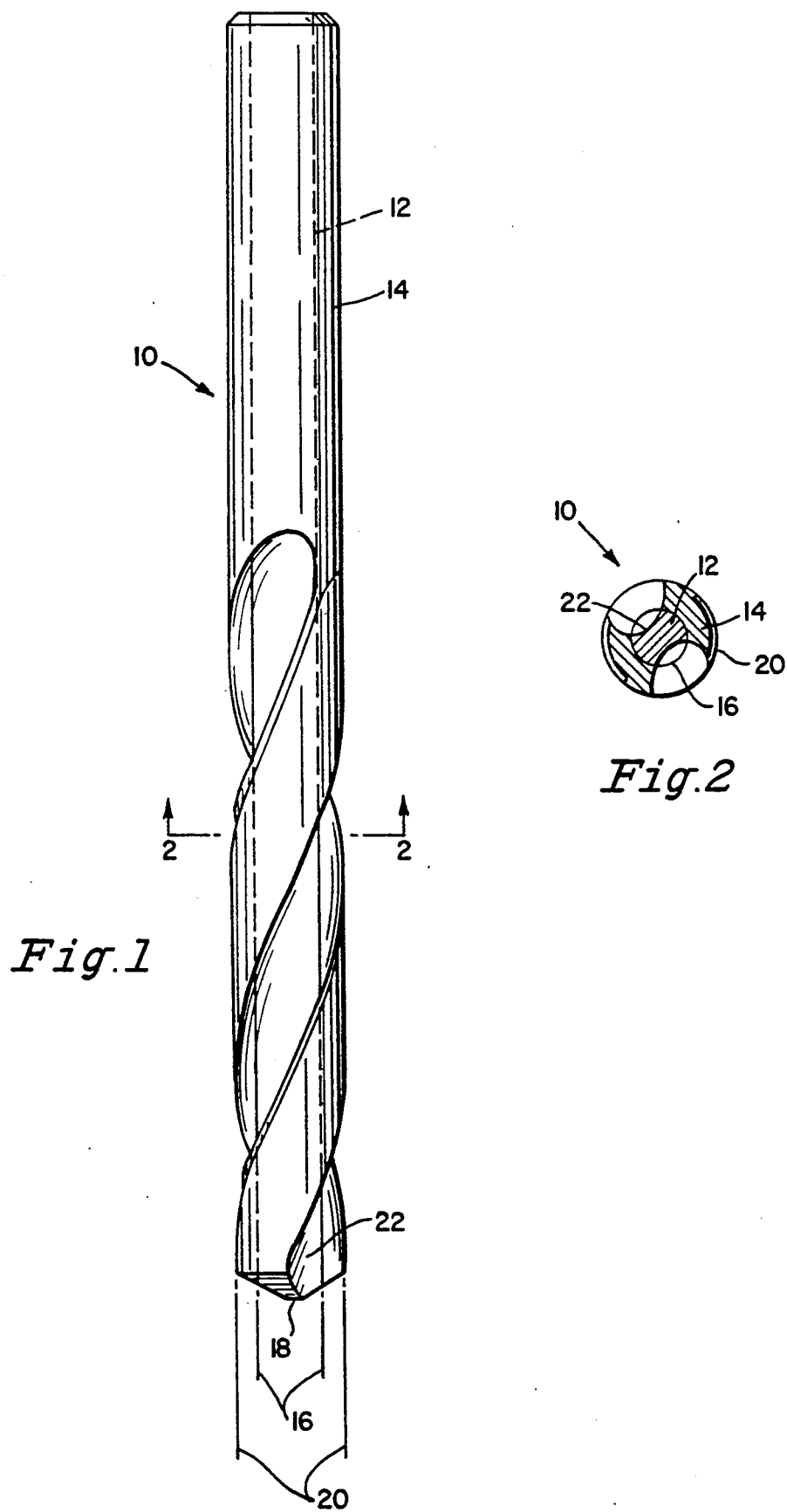

United States Patent
Ekerot

[11] Patent Number: 5,094,571
[45] Date of Patent: Mar. 10, 1992

[54] DRILL

[76] Inventor: Sven Ekerot, Minervavägen 19, S-191 50 Sollentuna, Sweden

[21] Appl. No.: 424,226
[22] PCT Filed: Apr. 8, 1988
[86] PCT No.: PCT/SE88/00178
§ 371 Date: Nov. 13, 1989
§ 102(e) Date: Nov. 13, 1989
[87] PCT Pub. No.: WO88/07905
PCT Pub. Date: Oct. 20, 1988

[30] Foreign Application Priority Data

Apr. 10, 1987 [SE] Sweden .................... 8701496

[51] Int. Cl.[5] .................................... B23B 51/02
[52] U.S. Cl. ............................ 408/144; 408/227
[58] Field of Search ............ 408/144, 227, 230; 76/108.6, DIG. 3

[56] References Cited

U.S. PATENT DOCUMENTS

| 2,240,840 | 5/1941 | Fischer | 408/144 |
| 2,351,827 | 6/1944 | McAllister | 408/144 |
| 3,017,790 | 1/1962 | Werle | 408/144 |
| 4,813,823 | 3/1989 | Bieneck | 408/144 |

FOREIGN PATENT DOCUMENTS

| 184784 | 6/1986 | European Pat. Off. | 408/230 |
| 169706 | 9/1984 | Japan | 408/227 |
| 48207 | 3/1985 | Japan | 408/230 |
| 427090 | 3/1983 | Sweden . | |
| 487737 | 12/1975 | U.S.S.R. | 408/144 |
| 1269922 | 11/1986 | U.S.S.R. | 408/230 |
| 2068278 | 8/1981 | United Kingdom . | |

*Primary Examiner*—Daniel W. Howell
*Attorney, Agent, or Firm*—Nies, Kurz, Bergert & Tamburro

[57] ABSTRACT

A drill produced from a substantially rod-like blank containing high speed steel has at one end thereof a pointed tip which is intended to penetrate the material to be drilled. The drill is preferably a helical drill having edge parts which extend essentially from the outer part of the drill tip to the periphery of the drill cross-section, and further includes a radially open groove which extends helically along the drill, for the purpose of removing chippings from the drill.

The drill is particularly characterized in that the blank, and therewith also the drill, in cross-section includes a central steel part, which is intended to exhibit high compressive strength, and which therewith forms the outer part of the drill tip, and a concentrical outer layer of high-speed steel which is intended to exhibit high thermal stability and which is applied with the aid of a casting technique.

7 Claims, 1 Drawing Sheet

DRILL

The present invention relates to a drill manufactured from a substantially rod-like blank containing high speed steel. The invention also relates to a method for producing a drill according to the invention.

Drills of the kind meant here are intended for drilling primarily metal and are cylindrical in shape and include a pointed tip which is intended to be inserted into the material to be drilled and cutting edge-parts located in the vicinity of said drill tip. In this regard, slightly different requirements are placed on the drill material in the radial direction of the drill cross-section. The centrally located parts of the drill, the drill tip, are required to have a high compression strength and wear resistance. In addition to being wear resistant, the outer parts of the drill are also required to have a high temperature stability, because of the high relative speeds between the outer drill parts and the material being drilled.

Drills of this kind are manufactured from high-speed steel-rod, although optimum regard is not paid, however, to the aforesaid variation regarding the requisite material properties. This will often result in the use of a more expensive material than is actually required.

The present invention relates to a drill in which the properties of the drill material vary radially in the cross-section of the drill, and in which the properties of the material have been adapted to occurrent stresses as described hereinafter.

According to the invention, at least part of the drill material, with regard to its composition, can be selected with regard to desired material properties and not, as is usual, also with regard to the working properties of the material, primarily the hot working properties thereof. This will also enable very high contents of alloying substances to be used.

The invention thus relates to a drill produced from a substantially rod-like blank which contains high speed steel. The drill has at one end thereof a pointed tip which is intended to penetrate the material to be drilled, and is preferably a helical-type drill which includes cutting edges which extend essentially from the center part of the drill tip to the periphery of the drill cross-section, and also at least one radially open groove which extends helically along the drill, for the removal of chippings.

The inventive drill is particularly characterized in that the blank, and herewith also the drill in cross-section, comprises a steel central part which is adapted to exhibit high compressive strength and which forms the outer part of the drill tip, and a concentric, outer layer of high speed steel which is adapted to exhibit high thermal stability and which is applied by means of a casting technique.

The invention will now be described in more detail with reference to an illustrative embodiment thereof, shown in the accompanying drawing, in which:

FIG. 1 is a side elevation of a drill constructed from a rod-like blank made in accord with the present invention; and FIG. 2 is a section taken through the plane 2—2 of the drill in FIG. 1.

According to the invention the drill blank, and therewith also the drill, includes, in cross-section, a central part which is adapted to exhibit high compressive strength and to form, inter alia, the drill tip. The requirement of thermal stability is not especially accentuated in this case. In the case of slightly simpler and less expensive drills, the central drill part may comprise carbon steel, i.e. not necessarily high speed steel. In the case of high performance drills, however, it is preferred in many cases to produce the central part of the drill from high speed steel, although not necessarily a high speed steel which possesses high thermal stability.

Furthermore, in accordance with the invention, the said outer layers of the drill comprise high speed steel, although a somewhat simpler high speed steel can be accepted in the case of simpler and less expensive drills. In the case of high performance drills, a high speed steel possessing very high thermal stability is preferably used.

The contents recited with regard to material compositions are all in percent by weight. By the expression "up to $X\%$" is meant contents which lack substantially the substance concerned or which contain only traces of said substance up to contents of $X\%$.

In accordance with one preferred embodiment the aforesaid outer layer will comprise a high speed steel which contains, in percent by weight, 0.7–2% C, up to 6% Cr, up to 10% Mo, up to 16% W, up to 3% V, 5–15% Co, with the remaining alloying substances being present in essentially normally occurring contents, with the remainder consisting of Fe and normally occurring impurities. In this regard, very high W-contents are suitably corresponded by relatively low Mo-contents, since these substances can, to a certain extent, be substituted one for the other.

When the aforesaid central drill part comprises high speed steel, the steel will contain, in accordance with one preferred embodiment, in percent by weight, 0.7–2% C, up to 6% Cr, up to 10% Mo, up to 16% W, up to 3% V, with the remaining alloying substances being present in essentially normally occurring proportions, with the remainder comprising Fe together with normally occurring impurities.

It is also preferred that casting is effected in an essentially known manner, i.e. by the direct casting of a metal melt essentially in accordance with Swedish Patent 8003487-9, the English language version of which is found in PCT International Publication No. WO 81/03136, published Nov. 12, 1981. That known prior art teaches an apparatus where molten metal is caused to run from a container through an outlet port therein and caused to form a continuous wire-like body by stabilizing with the aid of a wire which passes continuously through the outlet port whereafter the continous jet of molten metal surrounding the wire is solidified around said wire and collected, there being formed a wire which includes a core corresponding to the stabilizing wire, and a concentrical outer layer corresponding to the molten metal. Alternatively the continuous casting can be effected in by so-called dip-forming, as discussed in SE Patent No. 8003487-9, in which a wire is passed through a molten metal bath and a layer of bath metal frozen onto the wire, there being formed a wire which includes a core, corresponding to the wire passing through the molten bath, and a concentrical outer layer, corresponding to the bath metal.

The function of the inventive drill 10 and the advantages afforded thereby will be apparent essentially from the aforegoing. Thus, when seen in the radial direction, the material from which the inventive drill is comprised has been adapted to stresses which occur when the drill is in use. Casting of the outer drill layer 14 onto a central core 12 eliminates problems associated with the manufacture of wire from cast ingots or blanks whose cross-sectional size is many times greater than size of the ultimate wire. Thus, this eliminates problems associated primarily with the hot rolling of high alloyed, high-speed steel type materials. This enables the drill blank to be produced at much lower costs than when manufacturing in accordance with traditional methods.

The invention has been described in the aforegoing with reference to a number of embodiments thereof. It will be understood, however, that other embodiments are conceivable and that minor modifications can be made without departing from the scope of the invention.

For example, the wire, or rod, forming the central part 12 of the drill 10 can conceivably be produced by casting in the aforedescribed manner. Furthermore, the material from which the central drill part 12 is made and from which the outer drill layer 14 is made can have compositions other than those recited above. The recited proportions in which the various constituents are present are only rough values, since the method for producing the drill blank enables a great deal of freedom with regard to composition, wherewith compositions which lie outside normally occurring high-speed steel compositions are highly conceivable.

It has been said in the aforegoing that the central part 12 of the drill comprises a material which possesses high compressive strength. It is meant by this that the material either exhibits said high compressive strength or can be brought to a condition of high compressive strength, e.g. by heat treatment.

As beforementioned, the invention is particularly suited to the manufacture of helical drills 10, as seen in FIGS. 1 and 2, which include edge portions 14 which extend from the outer part 16 of the drill tip 18 to the periphery 20 of the drill cross-section, and which also include at least one radially open groove 22 which extends helically along the drill, for the removal of chippings. The invention can also conceivably be applied to other types of drill.

The invention shall not therefore be considered limited to the aforedescribed and illustrated embodiments, since modifications can be made within the scope of the following claims.

I claim:

1. A drill produced from a substantially rod-like blank containing high speed steel, said drill having at one end thereof a tip intended to penetrate the material to be drilled, and said drill including a central core and edge parts which extend substantially from the outer part of the central core to the outer periphery of the drill cross-section, and which further includes at least one radially open groove which extends helically along the drill for the purpose of transporting chippings, the improvement comprising: that the blank, and therewith also the drill, includes in cross-section said central core made from a first steel, a characteristic of which is a high compressive strength, and which forms the drill tip; and further includes a concentrical cast outer layer of a second steel around the first steel in the central core, said concentric outer layer being a high speed steel, having a characteristic of high thermal stability, which includes in percent by weight, 0.7-2% C, up to 6% Cr, up to 10% Mo, up to 16% W, up to 3% V, 5-15% Co, the remaining alloying substances being present essentially in normally occurring proportions, and the remainder being Fe together with normally occurring impurities.

2. A drill according to claim 1, wherein said central core part comprises high speed steel.

3. A drill according to claim 1, wherein said central core part comprises carbon steel.

4. A drill produced from a substantially rod-like bland containing high speed steel, said drill having at one end thereof a tip intended to penetrate the material to be drilled, and said drill including a central core and edge parts which extend substantially from the outer part of the central core to the outer periphery of the drill cross-section, and which further includes at least one radially open groove which extends helically along the drill for the purpose of transporting chippings, the improvement comprising: that the blank, and therewith also the drill, includes in cross-section said central core made from a first steel, a characteristic of which is a high compressive strength, and which forms the drill tip; and further includes a concentrical cast outer layer of a second steel around the first steel in the central core, said concentric outer layer being a high speed steel, having a characteristic of high thermal stability, which includes in percent by weight, 0.7-2% C, up to 6% Cr, up to 10% Mo, up to 16% W, up to 3% V, 5-15% Co, the remaining alloying substances being present essentially in normally occurring proportions, and the remainder being Fe together with normally occurring impurities, said blank being a portion of an essentially continuous wire-like body made in a known manner by a continuous casting process which provides that a center core portion of the wire-like body is made from said first steel and is surrounded by a concentric continuously cast outer layer, made from said second steel, resulting from a continuous casting of molten said second steel on said core of said first steel.

5. A drill produced from a substantially rod-like blank containing high speed steel, said drill having at one end thereof a tip intended to penetrate the material to be drilled, and said drill including a central core and edge parts which extend substantially from the outer part of the central core to the outer periphery of the drill cross-section, and which further includes at least one radially open groove which extends helically along the drill for the purpose of transporting chippings, the improvement comprising: that the blank, and therewith also the drill, includes in cross-section said central core made from a first steel which is a high speed steel, a characteristic of which is a high compressive strength, and which forms the drill tip, said central core part including, in percent by weight, 0.7-2% C, up to 6% Cr, up to 10% Mo, up to 16% W, up to 3% V, the remaining alloying substances being present in substantially normally occurring proportions and the remainder comprising Fe together with normally occurring impurities; and further includes a concentrical cast outer layer of a second steel around the first steel in the central core, said concentric outer layer being a high speed steel, having a characteristic of high thermal stability, said blank being a portion of an essentially continuous wire-like body made in a known manner by a continuous casting process which provides that a center core portion of the wire-like body is made from said first steel and is surrounded by a concentric continuously cast outer layer, made from said second steel, resulting from a continuous casting of molten said second steel on said core of said first steel.

6. A drill produced from a substantially rod-like blank containing high speed steel, said drill having at one end thereof a tip intended to penetrate the material to be drilled, and said drill including a central core and edge parts which extend substantially from the outer part of the central core to the outer periphery of the drill cross-section, and which further includes at least one radially open groove which extends helically along the drill for the purpose of transporting chippings, the improvement comprising: that the blank, and therewith also the drill, includes in cross-section said central core made from a first steel which is a high speed steel, a characteristic of which is a high compressive strength, and which forms the drill tip, said central core part including, in percent by weight, 0.7-2% C, up to 6% Cr, up to 10% Mo, up to 16% W, up to 3% V, the remaining alloying substances being present in substantially normally occurring proportions and the remainder comprising Fe together with normally occurring impurities; and further includes a concentrical cast outer layer of a second steel around the first steel in the central core, said concentric outer layer being a high speed steel, having a characteristic of high thermal stability.

7. A drill according to claim 6, wherein said concentrically cast outer layer comprises high speed steel which includes in percent by weight, 0.7-2% C, up to 6% Cr, up to 10% Mo, up to 16% W, up to 3% V, 5-15% Co, the remaining alloying substances being present essentially in normally occurring proportions, and the remainder being Fe together with normally occurring impurities.

* * * * *